(12) United States Patent
Capito

(10) Patent No.: US 7,445,106 B2
(45) Date of Patent: Nov. 4, 2008

(54) ELECTRONICALLY-CONTROLLED HYDRAULICALLY-ACTUATED COUPLING

(75) Inventor: Russell T. Capito, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 267 days.

(21) Appl. No.: 11/201,468

(22) Filed: Aug. 11, 2005

(65) Prior Publication Data

US 2007/0034475 A1 Feb. 15, 2007

(51) Int. Cl.
F16D 25/12 (2006.01)
F16D 43/284 (2006.01)
F16D 48/12 (2006.01)

(52) U.S. Cl. .................. 192/85 AA; 192/82 T; 192/103 F

(58) Field of Classification Search .............. None
See application file for complete search history.

(56) References Cited

U.S. PATENT DOCUMENTS

| | | | |
|---|---|---|---|
| 3,546,969 A | 12/1970 | Gibson et al. | |
| 4,862,769 A | 9/1989 | Koga et al. | |
| 4,909,371 A | 3/1990 | Okamoto et al. | |
| 4,923,029 A | 5/1990 | Lanzer | |
| 5,224,906 A | 7/1993 | Sturm | |
| 5,811,948 A * | 9/1998 | Sato et al. | 318/434 |
| 5,960,922 A * | 10/1999 | Riess et al. | 192/85 C |
| 6,315,097 B1 | 11/2001 | Burns | |
| 6,398,686 B1 | 6/2002 | Irwin | |
| 6,461,267 B1 | 10/2002 | Paielli | |
| 6,581,741 B2 | 6/2003 | Taureg | |
| 6,595,086 B2 | 7/2003 | Kobayashi | |
| 6,672,420 B2 | 1/2004 | Porter | |
| 6,681,913 B2 | 1/2004 | Lee | |
| 6,725,989 B1 | 4/2004 | Krisher et al. | |
| 6,745,879 B1 | 6/2004 | Dolan | |
| 6,817,434 B1 | 11/2004 | Sweet | |
| 6,848,555 B2 | 2/2005 | Sakata et al. | |
| 2001/0022507 A1 * | 9/2001 | Marinus et al. | 318/727 |
| 2002/0162722 A1 * | 11/2002 | Suzuki et al. | 192/84.6 |
| 2003/0230461 A1 * | 12/2003 | Sakata et al. | 192/85 AA |
| 2004/0251070 A1 * | 12/2004 | Sakata et al. | 180/247 |
| 2005/0167224 A1 * | 8/2005 | Puiu | 192/85 AA |

* cited by examiner

Primary Examiner—Rodney H Bonck
(74) Attorney, Agent, or Firm—Harness, Dickey & Pierce, P.L.C.

(57) ABSTRACT

A power transmission device includes a friction clutch operable to selectively transfer torque between an input member and an output member. An actuator is operable to provide an actuating force to the friction clutch. The actuator includes an electric motor having an output shaft drivingly coupled to a gerotor. The gerotor is operable to provide pressurized fluid to a piston acting on the friction clutch.

18 Claims, 5 Drawing Sheets

ELECTRONICALLY-CONTROLLED HYDRAULICALLY-ACTUATED COUPLING

BACKGROUND AND SUMMARY OF THE INVENTION

The present invention relates generally to a power transmission device operable to selectively transfer torque between first and second sets of drivable wheels of a vehicle. More particularly, the present invention is directed to a power transmission device adapted for use in motor vehicle driveline applications having an actuator including an electric motor drivably coupled to a gerotor for providing pressurized fluid to a piston acting on a friction clutch.

Due to increased demand for four-wheel drive vehicles, many power transmission systems are typically being incorporated into vehicle driveline applications for transferring drive torque to the wheels. Many vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation. At least one known torque transfer mechanism includes a dog-type lock-up clutch that may be selectively engaged for rigidly coupling the secondary driveline to the primary driveline when the vehicle is operated in four-wheel drive mode. Drive torque is delivered only to the primary driveline when the lock-up clutch is released and the vehicle operates in a two-wheel drive mode.

Another type of power transmission device is operable for automatically directing drive torque to the secondary wheels without any input or action on the part of a vehicle operator. When traction is lost at the primary wheels, four-wheel drive mode is engaged. Some transfer cases are equipped with an electrically-controlled clutch actuator operable to regulate the amount of drive torque transferred to a secondary output shaft as a function of changes in vehicle operating characteristics such as vehicle speed, throttle position and steering angle. Typically in the power transfer device is a clutch positioned within the transfer case housing.

While many power transfer devices are currently used in four-wheel drive vehicles, a need exists to advance the technology and recognize the system limitations. For example, the size, weight and packaging requirements of the power transmission device may make such systems cost prohibitive in some four-wheel drive applications.

The present invention provides a power transmission device including a friction clutch operable to selectively transfer torque between an input member and an output member. An actuator is operable to provide an actuating force to the friction clutch. The actuator includes an electric motor having an output shaft drivingly coupled to a gerotor. The gerotor is operable to provide pressurized fluid to a piston acting on the friction clutch. The gerotor substantially deadheads and the output shaft of the electric motor rotates between 0-100 rpm during actuation of the friction clutch.

In one embodiment, the power transmission device includes a controller operable to determine a magnitude of torque to be transferred. The controller controls the actuator to pressurize fluid within a closed cavity containing a piston acting on a friction clutch to generate the requested magnitude of torque. The controller is operable to vary the supply of electrical energy to the motor via pulse width modulation to vary the output of a positive displacement pump and vary the output torque of the friction clutch. The motor is operable to continuously rotate while torque is being transferred by the friction clutch.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is directed to a power transmission device that may be adaptively controlled for modulating the torque transferred between a rotatable input member and a rotatable output member. The torque transfer mechanism may be useful within motor vehicle drivelines as a stand-alone device that may be easily incorporated between sections of propeller shafts, directly coupled to a driving axle assembly, or other in-line torque coupling applications. Accordingly, while the present invention is hereinafter described in association with a specific structural embodiment for use in a driveline application, it should be understood that the arrangement shown and described is merely intended to illustrate an exemplary embodiment of the present invention.

Figure 1:
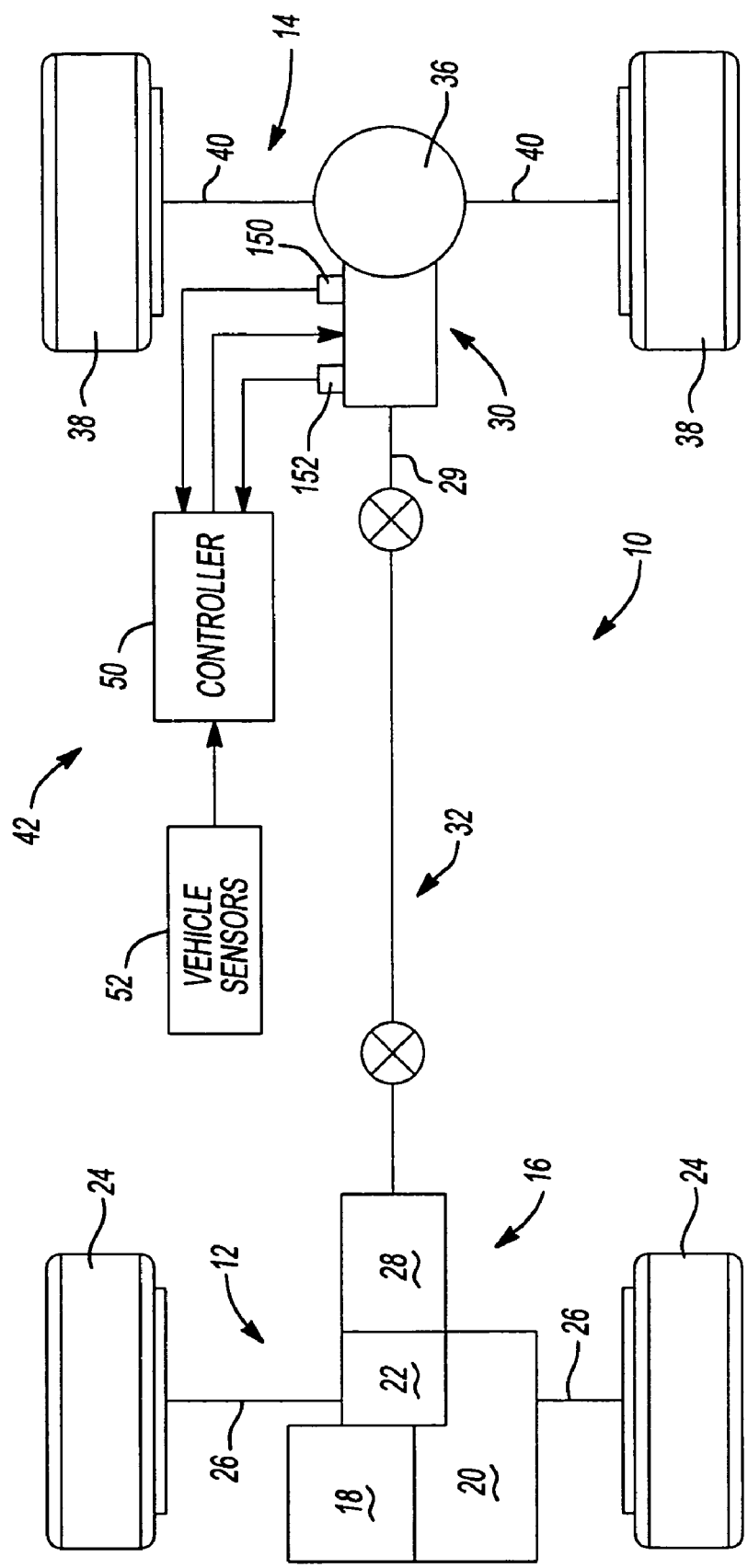
FIG. 1 is a schematic of a four-wheel drive vehicle equipped with a power transmission device of the present invention.

With reference to FIG. 1 of the drawings, a drive train 10 for a four-wheel vehicle is shown. Drive train 10 includes a first axle assembly 12, a second axle assembly 14 and a power transmission 16 for delivering drive torque to the axle assemblies. In the particular arrangement shown, first axle 12 is the front driveline while second axle 14 is the rear driveline. Power transmission 16 includes an engine 18 and a multi-speed transmission 20 having an integrated front differential unit 22 for driving front wheels 24 via axle shafts 26. A transfer unit 28 is also driven by transmission 20 for delivering torque to an input member 29 of a coupling 30 via a driveshaft 32. The input member 29 of the coupling 30 is coupled to driveshaft 32 while its output member is coupled to a drive component of a rear differential 36. Second axle assembly 14 also includes a pair of rear wheels 38 connected to rear differential 36 via rear axle shafts 40.

Drive train 10 is shown to include an electronically-controlled power transfer system 42 including coupling 30. Power transfer system 42 is operable to selectively provide drive torque in a two-wheel drive mode or a four-wheel drive mode. In the two-wheel drive mode, torque is not transferred via coupling 30. Accordingly, 100% of the drive torque delivered by transmission 20 is provided to front wheels 24. In the four-wheel drive mode, power is transferred through coupling 30 to supply torque to rear wheels 38. The power transfer system 42 further includes a controller 50 in communication with vehicle sensors 52 for detecting dynamic and operational characteristics of the motor vehicle. The controller is operable to control actuation of coupling 30 in response to signals from vehicle sensors 52. The controller 50 may be programmed with a predetermined target torque split between the first and second sets of wheels. Alternatively, the controller may function to determine the desired torque to be transferred through coupling 30 via other methods. Regardless of the method used for determining the magnitude of torque to transfer, controller 50 operates coupling 30 to maintain the desired torque magnitude.

Figure 2:
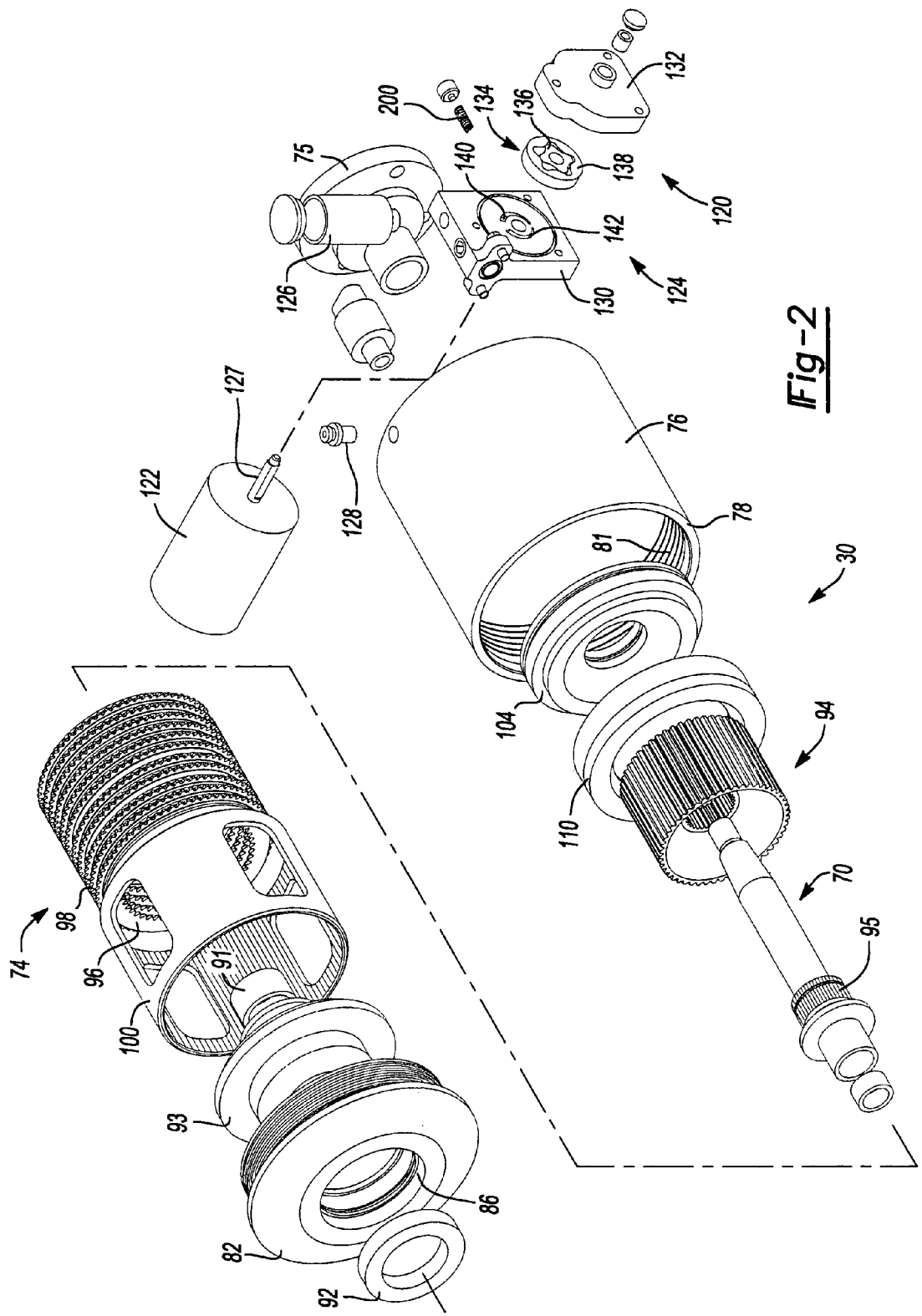
FIG. 2 is an exploded perspective view of an exemplary power transmission device.
Figure 3:
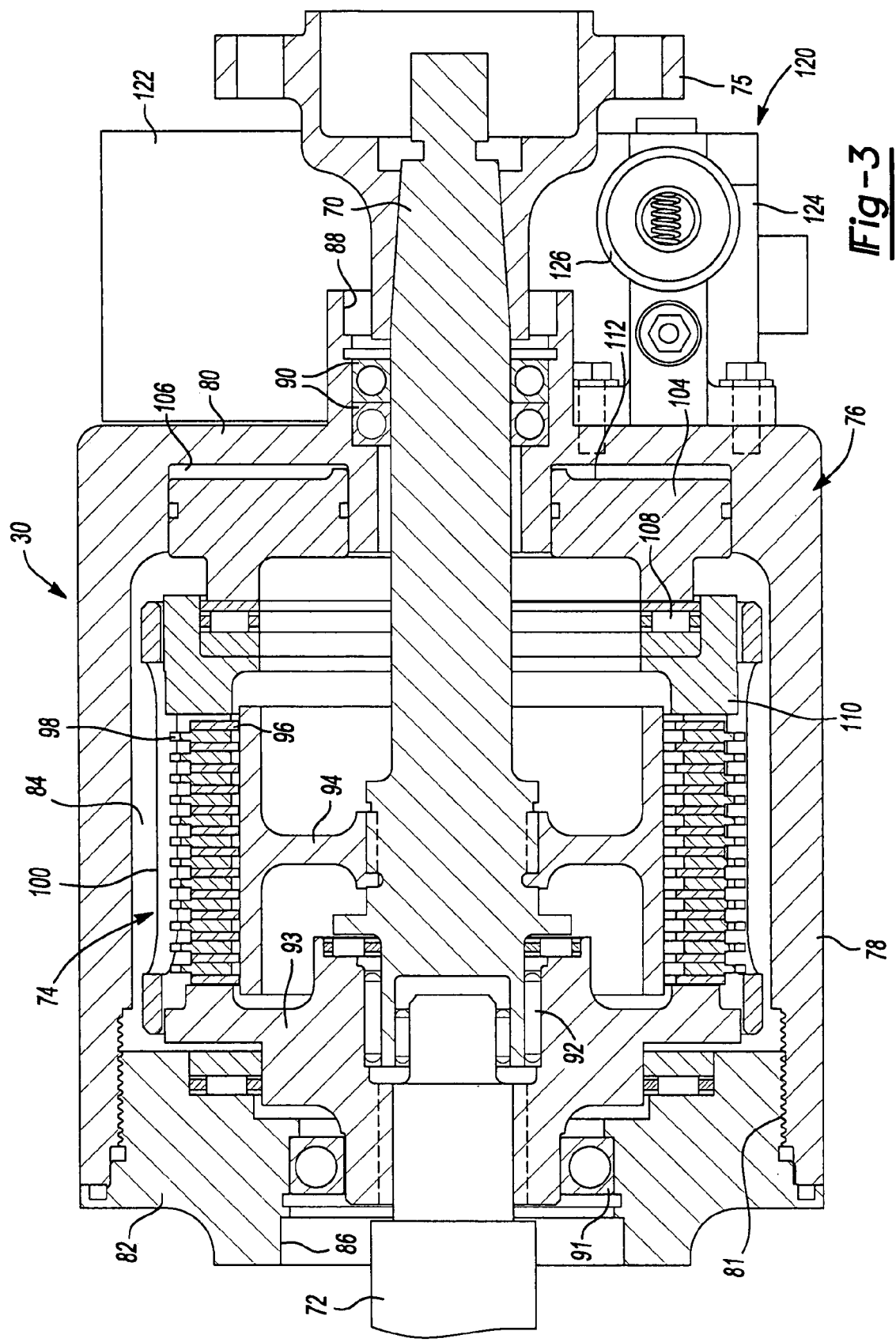
FIG. 3 is a cross-sectional side view of the power transmission device of FIG. 2.
Figure 4:
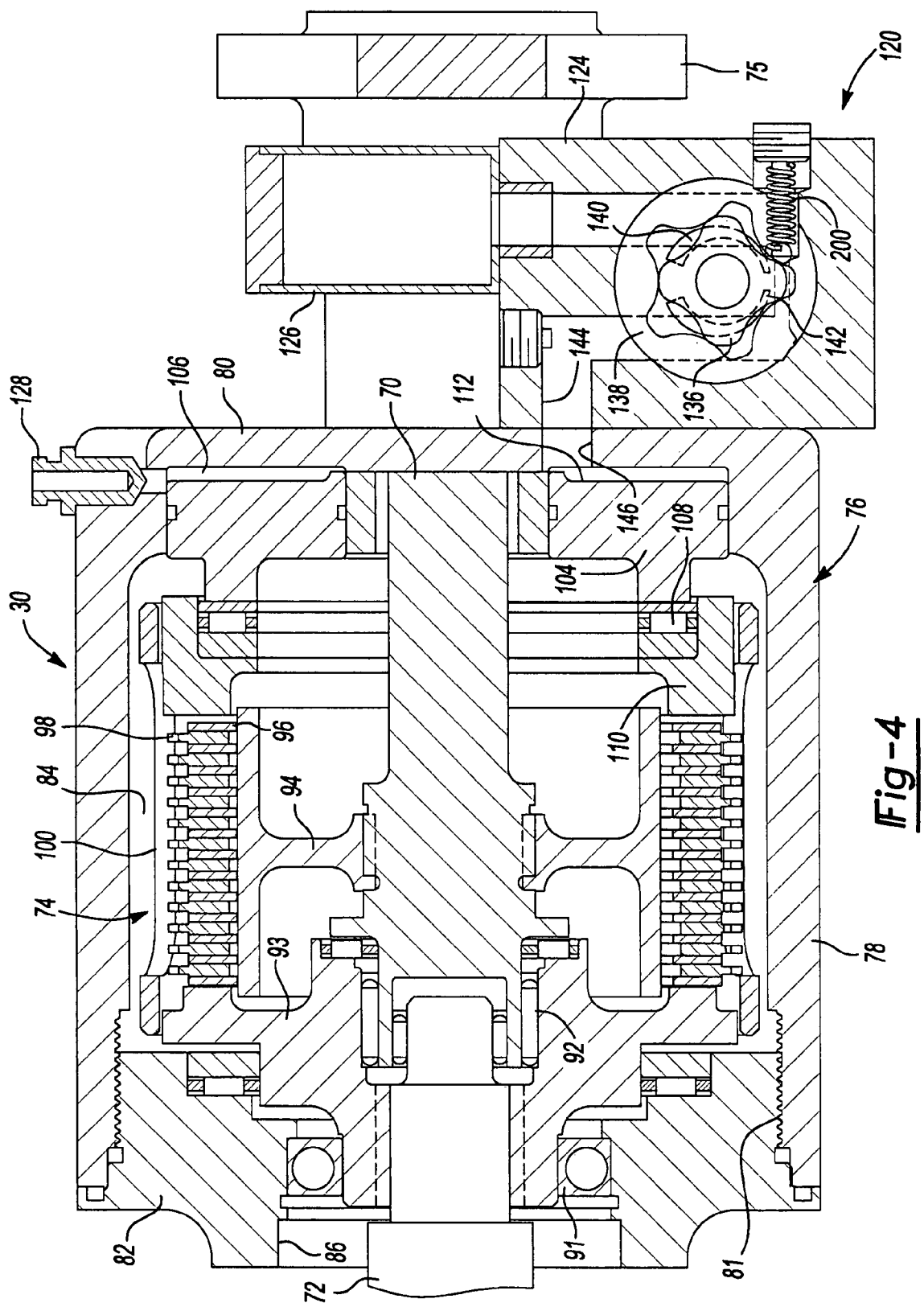
FIG. 4 is another cross-sectional side view of the power transmission device of FIG. 2.

FIGS. 2-4 depict coupling 30 in greater detail. Coupling 30 includes an input shaft 70 selectively drivingly coupled to an output shaft 72 via a friction clutch 74. A drive flange 75 is mounted on one end of input shaft 70 to provide a mounting provision for a driveline component such as driveshaft 32.

Coupling 30 includes a substantially cup-shaped housing 76 having a substantially cylindrically-shaped side wall 78 and an end wall 80. Side wall 78 includes an internally threaded portion 81 near the open end of housing 76. An end cap 82 is threadably engaged with threaded portion 81 to define a cavity 84. End cap 82 includes an aperture 86 extending therethrough. A portion of output shaft 72 extends through aperture 86. Housing 76 includes an aperture 88 extending through end wall 80. A portion of input shaft 70 extends through aperture 88. Bearings 90 are positioned within aperture 88 to rotatably support input shaft 70. Bearings 91 and 92 rotatably support an output spindle 93. Input shaft 70 includes a splined portion 95 (FIG. 2) drivingly coupled to a hub 94. A set of inner friction plates 96 are drivingly coupled to hub 94 via a splined engagement. Inner friction plates 96 are interleaved with a plurality of outer friction plates 98. Outer friction plates 98 are in splined engagement with a drum 100. Drum 100 is drivingly coupled to output spindle 93. Output spindle 93 is coupled with output shaft 72 via another splined interface. In the embodiment depicted, friction clutch 74 is a wet clutch. Accordingly, clutch fluid is contained within cavity 84 in communication with friction plates 96 and 98.

A piston 104 is slidably positioned within a cavity 106 formed within housing 76. Piston 104 is axially moveable into engagement with a thrust bearing 108 and an apply plate 110. When pressurized fluid acts on a face 112 of piston 104, piston 104 translates and applies a force through thrust bearing 108 and apply plate 110 to the plurality of interleaved clutch plates 96 and 98. Torque is transferred between input shaft 70 and output shaft 72 via the components previously described when friction plates 96 and 98 are forced into contact with one another.

An actuator 120 is mounted to housing 76 to selectively supply pressurized fluid to cavity 106 and provide an apply force to friction clutch 74. Actuator 120 includes an electric motor 122, a pump 124, and a reservoir 126. Electric motor 122 includes an output shaft 127 drivingly engaged with pump 124 such that rotation of the output shaft of the electric motor causes fluid within reservoir 126 to be pressurized and enter cavity 106. A bleed screw 128 is coupled to housing 76 in communication with cavity 106. Bleed screw 128 functions to allow an operator to purge trapped air from the closed hydraulic system. This minimizes the power required to compress trapped air.

Pump 124 includes a housing having a first half 130, a second half 132 and a gerotor 134. Gerotor 134 includes an inner gear 136 and an outer rotor 138 in engagement with one another. Inner gear 136 is drivingly coupled to the output shaft of electric motor 122. In operation, low pressure fluid passes through an inlet port 140 formed in housing half 130. Inlet port 140 is in fluid communication with reservoir 126. Rotation of inner gear 136 relative to outer rotor 138 causes a pumping action to force highly pressurized fluid through an outlet port 142 formed in housing half 130. Outlet port 142 is in fluid communication with a passageway 144 formed in pump housing half 130. Passageway 144 is positioned in fluid communication with an aperture 146 formed in housing 76. In this manner, fluid output from gerotor 134 is supplied to cavity 106 to act on piston 104.

One skilled in the art should appreciate that gerotor 134 acts on a closed volume of fluid located within passageway 144 and cavity 106. Because gerotor acts on the closed volume of fluid, electric motor 122 rotates at a relatively high rpm for only a relatively short amount of time when the clearance between piston 104, thrust bearing 108, apply plate 110 and the interleaved friction plates 96 and 98 is eliminated. After the clearance has been taken up, piston 104 transfers force to apply plate 110 to cause friction clutch 74 to generate torque. At this time, piston 104 does not axially move and gerotor 134 enters a near dead-head mode. Due to the existence of a clearance between inner gear 136 and outer rotor 138 of gerotor 134, as well as a clearance between gerotor 134 and the pump housing, the output shaft of electric motor 122 continues to rotate inner gear 136 at a relatively low rotational speed of approximately 0-100 rpm to maintain a desired pressure acting on piston 104. Some of the fluid trapped within passageway 144 and cavity 106 passes by inner gear 136 and outer rotor 138 in the reverse direction thereby allowing the output shaft of the electric motor to continue to rotate. If the gerotor were completely sealed and did not allow any backflow or blow by, the electric motor would be forced to stop due to the incompressible nature of the fluid being pumped by gerotor 134.

Figure 5:
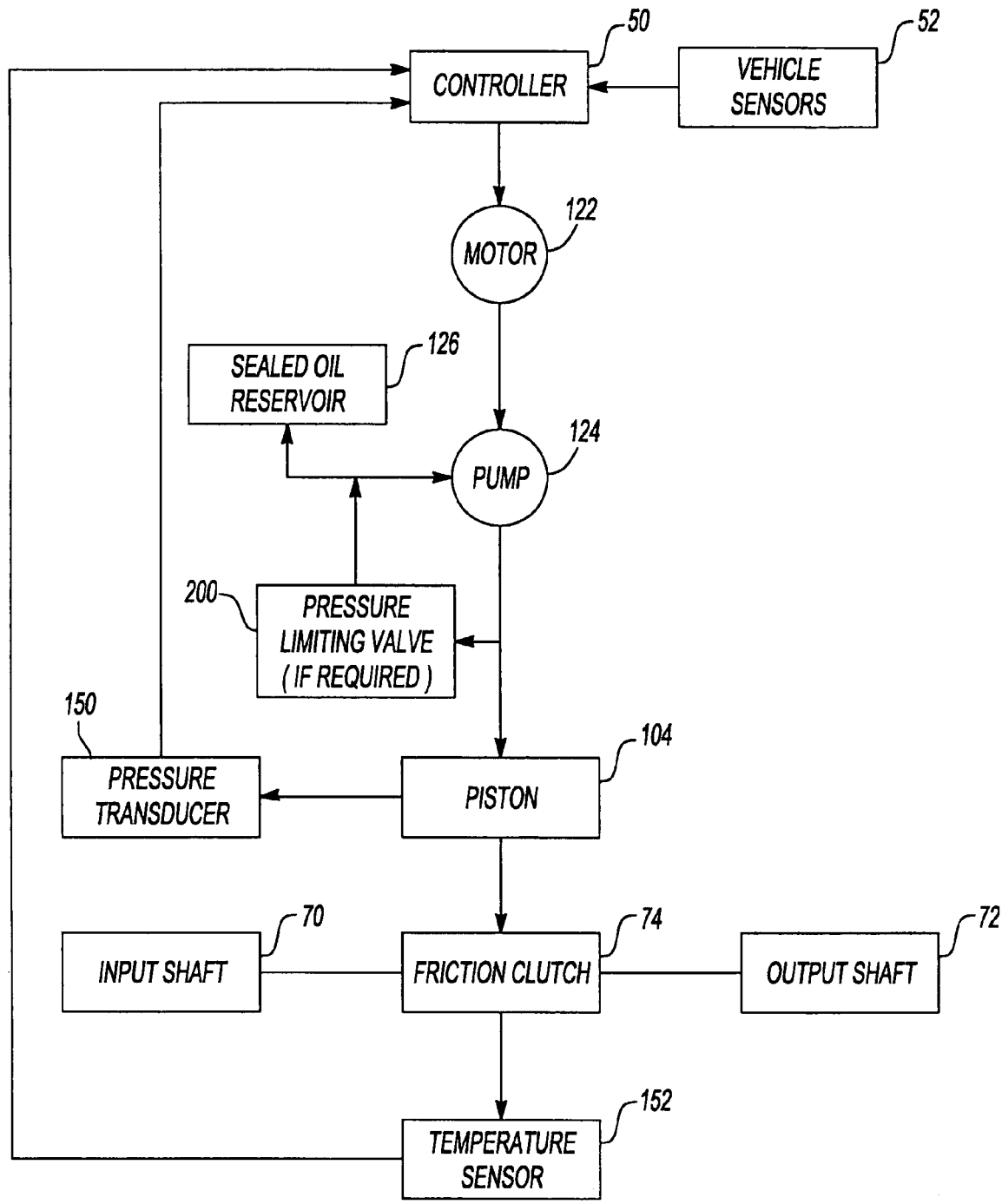
FIG. 5 is a schematic depicting the components of a torque transfer system including the power transmission device of the present invention.

As shown in FIG. 5, controller 50 is in communication with electric motor 122 as well as a pressure transducer 150. Pressure transducer 150 is operable to output a signal indicative of the fluid pressure within cavity 106. Controller 50 operates using a closed-loop feedback control to actuate electric motor 122 to maintain a target pressure acting on piston 104. Controller 50 is operable to provide a pulse width modulated signal to electric motor 122 to vary the output speed of the motor and the output pressure generated by pump 124. The pressure within cavity 106 should be proportional to the magnitude of torque output by friction clutch 74. By controlling the pressure maintained within cavity 106, the torque transferred through coupling 30 is controlled. Furthermore, a temperature sensor 152 is coupled to coupling 30 and is operable to provide controller 50 a signal indicative of the temperature of the clutch fluid contained within cavity 84. The controller 50 is programmed to vary the coupling control strategy based on clutch fluid temperature. The control strategy attempts to protect the clutch fluid from overheating.

In an alternate embodiment, a pressure relief valve 200 FIGS. 4 and 5) is plumbed in communication with the high pressure passageway 144. Pressure relief valve 200 is operable to allow pressurized fluid to pass from the high pressure side of pump 124 to the low pressure side at reservoir 126. Pressure relief valve 200 provides a path for the fluid within the previously described closed volume to escape. When pressure relief valve 200 allows flow therethrough, electric motor 122 may be operated at a higher rotational speed than previously described in the near dead-head operational mode of the pump. Depending on the type of electric motor fitted to coupling 30, it may be more or less desirable to incorporate pressure relief valve 200 into coupling 30. Specifically, if the electric motor may be operated at relatively low rotational speeds between 0-100 rpm for extended duration, it may not be necessary to include a pressure relief valve. On the contrary, if an electric motor design is chosen that must operate at higher rotational speeds, it may be desirable to include the pressure relief valve in order to provide a flow path for the fluid. It should also be appreciated that any number of gear arrangements may be inserted between the output shaft of electric motor 122 and the inner gear 136 of gerotor 134 thereby allowing the motor to operate a higher rotational speed while rotating the pump components at a low rotational speed. If a speed reducing gearset is used, a pressure relief valve is not necessarily required.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A power transmission device comprising:
   a housing;
   a rotatable input member at least partially positioned within said housing;
   a rotatable output member at least partially positioned within said housing;
   a spindle rotatably supported by said housing and fixed for rotation with said rotatable output member;
   a friction clutch operable to selectively transfer torque between said input member and said spindle; and
   an actuator operable to provide an actuating force to said friction clutch, said actuator including an electric motor having an output shaft drivingly coupled to a gerotor, said gerotor being operable to supply pressurized fluid to a piston acting on said friction clutch, said piston being positioned within a closed cavity in communication with an outlet port of said gerotor, wherein an end of said rotatable input member and an end of said rotatable output member are supported by said spindle;
   wherein a portion of said rotatable input member is telescopically arranged with a portion of said rotatable output member;
   wherein pressurized fluid within said closed cavity is forced to pass through said gerotor and enter a low pressure volume of fluid;
   wherein said power transmission device includes a cap sealingly engaging said housing to enclose said friction clutch and said piston therein; and
   wherein said cap includes an aperture adapted to receive at least a portion of said spindle and a portion of said output member.

2. The power transmission device of claim 1 further including a second housing separable from and mounted to said housing, said second housing enclosing said gerotor and a third housing separable from and mounted to said second housing, said third housing enclosing said electric motor.

3. The power transmission device of claim 1 further including a pressure relief valve operable to interconnect said closed cavity with a low pressure reservoir when a predetermined pressure is reached.

4. The power transmission device of claim 1 further comprising a pressure sensing device and a controller, the pressure sensing device being configured to sense a pressure of the pressurized fluid supplied to the piston and generate a first sensor signal in response thereto, the controller receiving the first sensor signal and controlling the electric motor based at least partially on the first sensor signal.

5. The power transmission device of claim 4 wherein the controller employs a closed-loop feedback control to control operation of the electric motor.

6. The power transmission device of claim 4 wherein the controller is configured to vary an output speed of the electric motor.

7. The power transmission device of claim 4 wherein the friction clutch is a wet clutch.

8. The power transmission device of claim 7 further comprising a temperature sensor for sensing a temperature of the friction clutch and responsively generating a second sensor signal, the controller receiving the second sensor signal and controlling the electric motor based at least partially on the second sensor signal.

9. The power transmission device of claim 1 wherein the actuator further includes a fluid conduit that couples the output of the pump to an input of the pump.

10. A power transmission device comprising:
    a housing;
    a rotatable input member at least partially positioned within said housing;
    a rotatable output member at least partially positioned within said housing;
    a spindle rotatably supported by said housing and fixed for rotation with said rotatable output member;
    a friction clutch operable to selectively transfer torque between said input member and said spindle; and
    an actuator operable to provide an actuating force to said friction clutch, said actuator including an electric motor having an output shaft drivingly coupled to a gerotor, said gerotor being operable to supply pressurized fluid to a piston acting on said friction clutch, said piston being positioned within a closed cavity in communication with an outlet port of said gerotor, wherein an end of said rotatable input member and an end of said rotatable output member are supported by said spindle;
    wherein said power transmission device includes a cap sealingly engaging said housing to enclose said friction clutch and said piston therein; and
    wherein said cap includes an aperture adapted to receive at least a portion of said spindle and a portion of said output member.

11. The power transmission device of claim 10, wherein a portion of said rotatable input member is telescopically arranged with a portion of said rotatable output member.

12. The power transmission device of claim 10 wherein pressurized fluid within said closed cavity is forced to pass through said gerotor and enter a low pressure volume of fluid.

13. The power transmission device of claim 10 further including a second housing separable from and mounted to said housing, said second housing enclosing said gerotor and a third housing separable from and mounted to said second housing, said third housing enclosing said electric motor.

14. The power transmission device of claim 10 further including a pressure relief valve operable to interconnect said closed cavity with a low pressure reservoir when a predetermined pressure is reached.

15. The power transmission device of claim 10 further comprising a pressure sensing device and a controller, the pressure sensing device being configured to sense a pressure of the pressurized fluid supplied to the piston and generate a first sensor signal in response thereto, the controller receiving the first sensor signal and controlling the electric motor based at least partially on the first sensor signal.

16. The power transmission device of claim 15 wherein the controller employs a closed-loop feedback control to control operation of the electric motor.

17. The power transmission device of claim 15 wherein the controller is configured to vary an output speed of the electric motor.

18. The power transmission device of claim 10 wherein the actuator further includes a fluid conduit that couples the output of the pump to an input of the pump.

\* \* \* \* \*